United States Patent [19]

Mori et al.

[11] 4,309,572
[45] Jan. 5, 1982

[54] CALL PROCESSING SYSTEM WITH AN OPERATOR ASSISTANCE IN A TELEPHONE SWITCHING SYSTEM

[75] Inventors: Hiromichi Mori, Kawasaki; Tatsuo Maruyama, Tokyo; Jun Matsumoto, Tama; Yoshikazu Ikeda, Tama, all of Japan

[73] Assignee: Kokusai Denshin Denwa Co., Ltd., Tokyo, Japan

[21] Appl. No.: 70,399

[22] Filed: Aug. 28, 1979

[30] Foreign Application Priority Data

Sep. 8, 1978 [JP] Japan .................. 53-109767

[51] Int. Cl.³ .......................... H04J 3/14; H04M 3/20
[52] U.S. Cl. .................................. 179/27 FE; 370/62
[58] Field of Search ........ 179/27 FF, 27 FE, 18 AD, 179/175.2 C; 370/62, 66

[56] References Cited

U.S. PATENT DOCUMENTS

| | | | |
|---|---|---|---|
| 3,171,896 | 3/1965 | Bartlett et al. | 370/62 X |
| 3,293,369 | 12/1966 | Schroeder | 370/62 X |
| 3,976,841 | 8/1976 | Picandet | 179/27 FE X |
| 3,978,290 | 8/1976 | Sarma | 179/18 AD X |

FOREIGN PATENT DOCUMENTS

| | | | |
|---|---|---|---|
| 2129380 | 12/1972 | Fed. Rep. of Germany | 179/18 AD |
| 2376577 | 7/1978 | France | 179/27 FF |
| 1281168 | 7/1972 | United Kingdom | 179/27 FF |

OTHER PUBLICATIONS

"New Switching Concept for Multilocation Customers", Carlson et al., *Bell Laboratories Record*, vol. 49, No. 8, Sep. 1971, pp. 231-237.
"SP-1 TOPS: Electronic Switching Improves Operator Services", Bierman, *Telesis*, vol. 3, No. 5, Feb. 1974, pp. 143-150.
"The GTD-120 Centralized Attendant Service Digital PABX", Garay, *GTE Automatic Electric Journal*, Jan., 1978, pp. 2-10.
"KDX-O International Telephone Switching System", Nakagome et al., International Switching Symposium, Boston, Jun. 1972, pp. 1-25.
"The XE-1 Stored Program Controlled International Telephone Switching System", Ikeda et al., International Switching Symp., Kyoto, Japan, Oct. 1976, pp. 211-3-1 thru 211-3-8.

*Primary Examiner*—Thomas W. Brown
*Attorney, Agent, or Firm*—Armstrong, Nikaido, Marmelstein & Kubovcik

[57] ABSTRACT

In a telephone switching system having a main-speech-path switch, connected to a plurality of subscribers and a plurality of board trunks, the connection in the main-speech-path switch is controlled as follows. In the first mode, the connection between a calling channel and one of the board trunks and the connection between a called channel and the board trunk are established through the main-path-switch, so as to selectively enable speech between an operator connected to said board trunk and one of a calling subscriber and a called subscriber. In the second mode, the connections between the calling channel and the called channel is directly established in the main-speech-path switch, while simultaneously connecting the two channels to the board trunk through the main-speech-path switch, so as to enable to monitor the speech between the calling subscriber and the called subscriber by the telephone operator. In the third mode, the main-speech-path switch effects only the connection between the calling channel and the called channel, while clearing the connection between said two channels and said board trunk. Thus, the main-speech-path switch is free from the board trunk except for the monitoring and the initial connection operation, and can increase the exchange capability.

2 Claims, 9 Drawing Figures

CALL PROCESSING SYSTEM WITH AN OPERATOR ASSISTANCE IN A TELEPHONE SWITCHING SYSTEM

BACKGROUND OF THE INVENTION

This invention relates to a telephone switching system using switchboards, and more particularly to an operator-assisted call processing system which is intended to efficiently use main-speech-path switches and switchboard equipments.

In order to provide telephone services that require action by operators, such as person-to-person calls in international telephone service, switchboards must be used in the telephone switching system. With a conventional telephone switching system with provisions for actions by an operator, to connect a calling subscriber to a called subscriber two speech-paths of a main-speech-path switch are fully occupied in spite of the fact that only one speech-path is sufficient for the connection of the two subscribers. This is because of the need for the operator to talk with either of the two subscribers. It is apparent that the use of two speech-paths of a main-speech-path switch throughout the period of one call means an inefficient utilization of the main-speech-path switch, because once the two subscribers are connected, only one speech-path is sufficient for the speech between the two subscribers unless interruption by the operator is required.

SUMMARY OF THE INVENTION

Therefore, an objective of the present invention is to overcome the aforesaid inefficiency of the conventional telephone switching system, by fully utilizing the highly efficient control functions of an electronic switching system, especially the easiness in setting up speech-paths of a time-division electronic switching system. Another objective of the present invention is to ensure the efficient use of main-speech-path switches and board trunks, while simplifying the structure of the board trunk.

The above and other objectives are attained by a call processing system for making the connection for a call by actions of an operator, characterized by a first mode wherein connections between a calling side channel and a board trunk and between a called side channel and the board trunk are established through a main-speech-path switch, so as to selectively enable speech between a switchboard connected to the board trunk and one of a calling subscriber and a called subscriber; a second mode wherein the calling side channel is directly connected to the called side channel in the main-speech-path switch, while simultaneously connecting the two channels to the board trunk through the main-speech-path switch, so as to enable to monitor speech between the calling subscriber and the called subscriber at the switchboard; and a third mode wherein the main-speech-path switch effects only the connection between the calling side channel and the called side channel, while separating the connection between the two channels and the board trunk.

BRIEF DESCRIPTION OF THE DRAWINGS

Other objectives and advantages of the present invention may be appreciated by referring to the following description, taken in conjunction with the accompanying drawings, in which.

DESCRIPTION OF THE PREFERRED EMBODIMENTS

Figure 1:
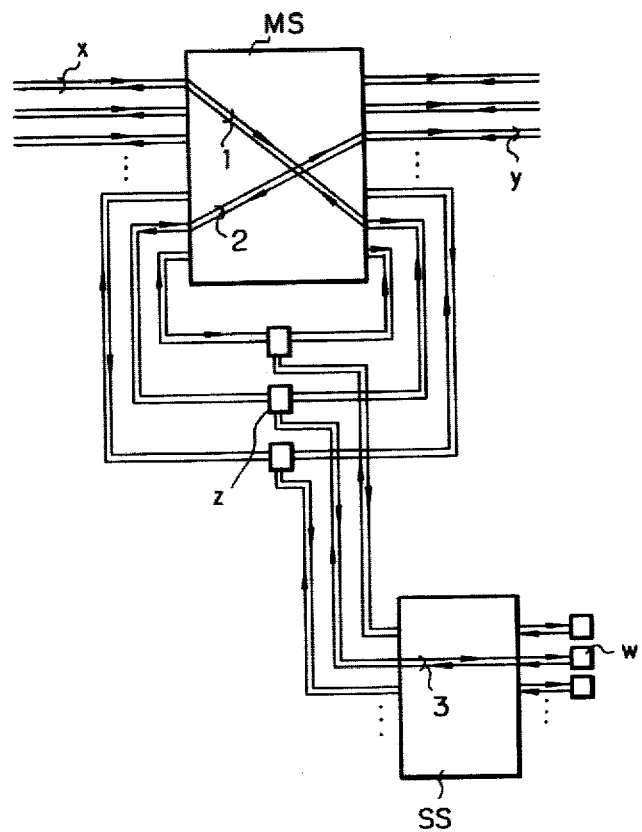
FIG. 1 is a schematic diagram of the essential portion of a conventional telephone switching system.

First, the operation of a typical conventional call processing system requiring actions of an operator will be described by referring to FIG. 1 for the easy understanding of the present invention. Let us assume a case wherein a call from a trunk line x is connected to another trunk line y under the control of switchboard w.

As the call is generated on the trunk line x, the trunk line x is at first connected to one of the then idle board trunks z, through a speech-path 1 established in a main-speech-path switch MS. The board trunk Z is connected to one of switchboards w through a speech-path 3 in a switchboard switch SS, so that a speech-path is completed between the calling subscriber and the switchboard. The speech-path between a called subscriber and the switchboard can be established by setting a speech-path 2 in the main-speech-path switch so as to connect the board trunk Z to the trunk line y. The board trunk has a function of 3-party communication, and under the conditions thus completed, the operator can talk with either one of the calling subscriber or the called subscriber by suitably operating control buttons on the switchboard. In addition to this, the operator can also monitor the speech between the calling subscriber and the called subscriber. After completing the necessary switching operations, the operator instructs both the calling subscriber and the called subscriber to start talking to each other, and upon confirming the start of regular speech therebetween, the operator releases the speech-path 3 in the switchboard switch SS. At this moment, the switchboard w is completely separated from the board trunk Z, and becomes ready for responding to another call. As long as the speech of the call lasts, the speech-path between the calling subscriber and the called subscriber is maintained through the circuit of the trunk line x - the speech-path 1 - the board trunk Z - the speech-path 2 - the trunk line y. When the monitoring of the speech is necessary, the board trunk Z is connected to the switchboard again through the switchboard switch.

With the conventional call processing system that requires the action of operators, although the calling subscriber and called subscriber can be connected through only one speech-path in the main-speech-path switch, two speech-paths 1 and 2 are continuously occupied for the connection due to the need for intervention of the switchboard. The intervention of the switchboard is necessary only during the process of connecting the calling subscriber to the called subscriber and during the monitoring of the speech, so that the exclusive use of the two speech-paths throughout the duration of each speech, including the period of not requiring the intervention of the switchboard, is not desirable from the standpoint of effective use of the main-speech-path switch.

Accordingly, the present invention intends to overcome the aforesaid drawback of the conventional techniques, by effectively utilizing the highly advanced control functions of the electronic switching system, especially by fully utilizing the easiness of setting up speech-paths in the time-division electronic switching system. With the present invention, the main-speech-path switch and the board trunk are efficiently used, and at the same time, the construction of the board trunk itself is simplified.

Figure 2:
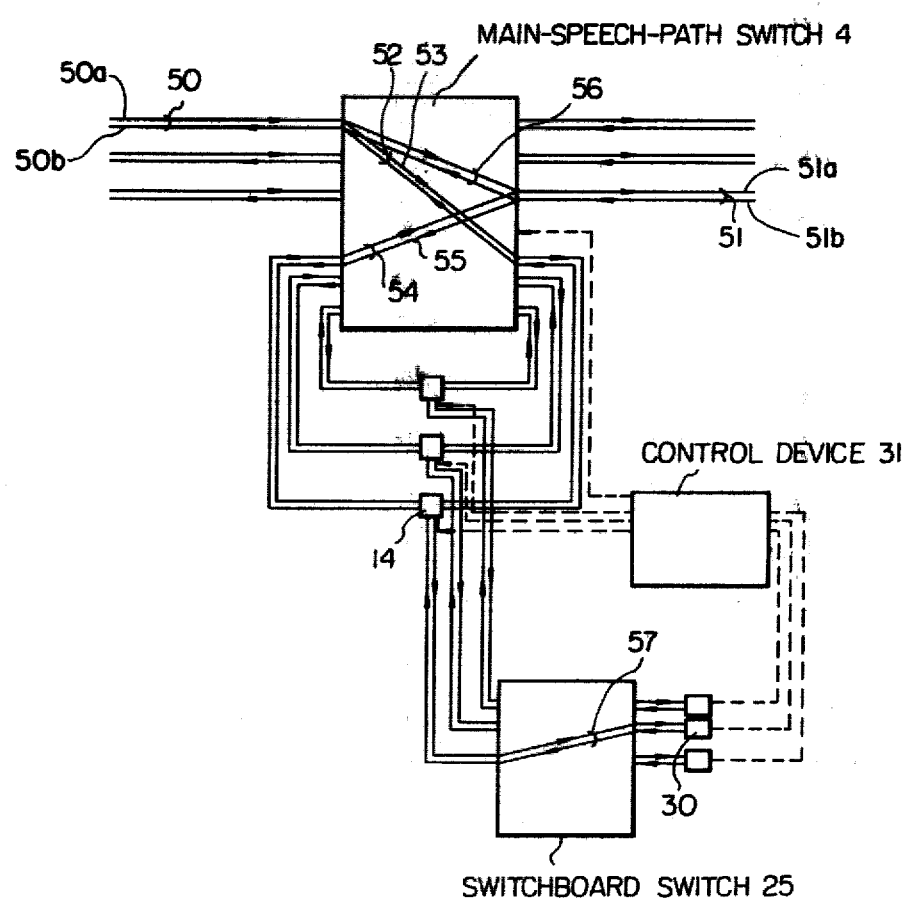
FIG. 2 is a schematic diagram of the essential portion of a telephone switching system according to the present invention.
Figure 3:
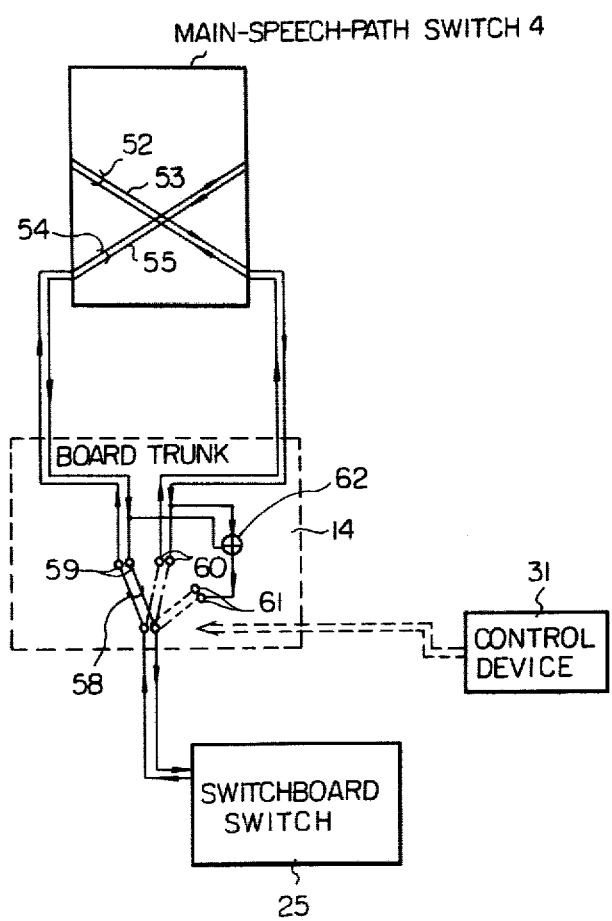
FIG. 3 is a detailed diagram of switching circuits of the board trunk 14 of FIG. 2.

The principles of the present invention will be described by referring to FIGS. 2 and 3. It is assumed that a call from the incoming trunk line 50 to the outgoing trunk line 51 is generated. Incoming trunk line 50 has an incoming portion 50a and an outgoing portion 50b. Outgoing trunk line 51 has an outgoing portion 51a and an incoming portion 51b. The calling subscriber is connected to the then idle switchboard 30 through one of the then idle board trunks 14, by setting up speech-paths 52 and 57 in a main-speech-path switch 4 and a switchboard switch 25, respectively. In this case, a switch 58 in the board trunk 14 is set at the position of a switch terminal 60 for connecting the calling subscriber to the switchboard 30. The called subscriber is connected to the switchboard 30, by setting up a speech-path 54 in the main-speech-path switch 4 for connecting the trunk line 51 to the board trunk 14 and, setting the switch 58 of the board trunk 14 at a switch terminal 59. The position change of the switch 58 can be carried out by operating the switchboard 30 through a control device 31. With the speech-paths 52 and 54 thus set up, the operator can talk with either the calling subscriber or the called subscriber by suitably operating the switch 58. To facilitate the start of the speech between the calling subscriber and the called subscriber, another speech-path 56 is set up in the main-speech-path switch 4 for directly connecting the trunk line 50 to the trunk line 51, while the switch 58 of the board trunk 14 is set at a switch terminal 61 for monitoring the speech between the two subscribers. As regards the speech-paths 52 and 54, of the two-way paths, the paths 53 and 55 directed to the board trunk are maintained as connected.

The voices from the calling subscriber and the called subscriber are directly transmitted to each other through the speech-path 56, respectively, and simultaneously delivered to the board trunk 14 through the speech-paths 53 and 55, respectively. Those voices are mixed by an adder circuit 62 and then sent to the switchboard 30 through the speech-path 57 in the switchboard switch 25. In short, under these conditions (i.e. monitor mode), the operator can monitor the speech between the calling subscriber and the called subscriber. If the operator finds any abnormality in the speech by the monitoring, the operator can separate the speech-path 56 and re-establish the two-way speech-paths 52 and 54 so that the operator may communicate with the calling subscriber, or the called subscriber by turning the switch 58 to the terminal 60 or 59, for taking suitable actions to cope with the abnormality. On the other hand, if the operator confirms the start of regular speech by the monitoring, the operator releases the speech-paths 53, 55, 57 and the board trunk 14, and fully isolates the switchboard 30 from the speech.

An embodiment of the present invention will now be described in detail.

Figure 4:
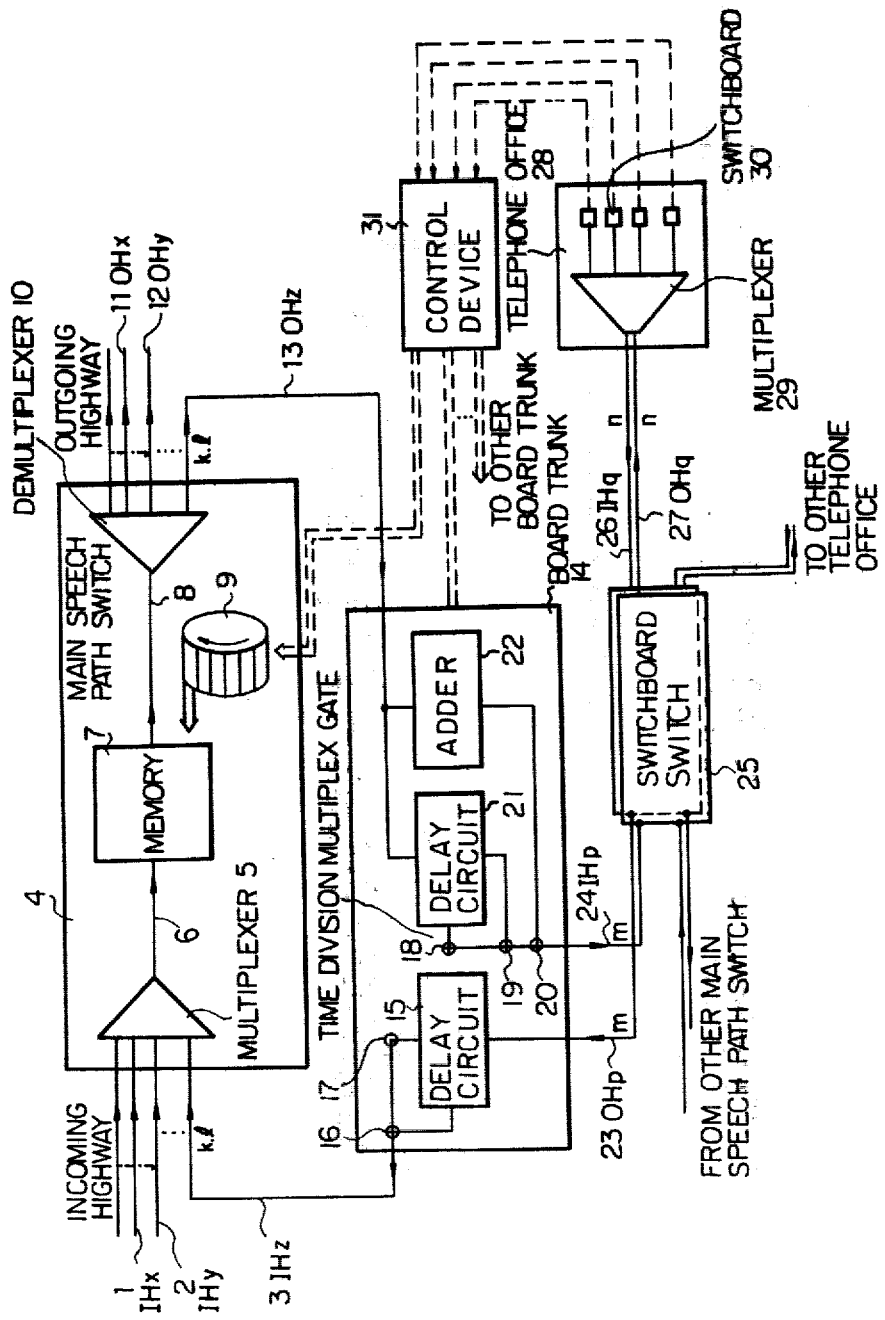
FIG. 4 is a block diagram showing the construction of an embodiment of the telephone switching system according to the present invention.

FIG. 4 shows a PCM switching device using a one-stage memory switch as a main-speech-path switch, which embodies the present invention.

With a time-division four-wire switching system, the sending side and the receiving side of a trunk link are separately mounted on opposite sides of a switch as an incoming highway and an outgoing highway, as shown in FIG. 4. One pair of communicating speech-paths consists of one channel on the incoming highway and the corresponding one channel on the outgoing highway, i.e., the corresponding one channel from each of the two highways.

The operation of the main-speech-path switch 4 will be described at first.

All the channels on the incoming highway are fixedly multiplexed onto specific time slots on an incoming high-speed highway 6, by means of a multiplexer 5. A memory 7 includes that number of words which number is the same as the number of time slots in one frame of the incoming high-speed highway 6 and the outgoing high-speed highway 8, so that the signals in successive time slots on the incoming high-speed highway 6 are successively written into the memory addresses which are in one-to-one correspondence with the time slots. The words on a speech holding memory 9 correspond to the time slots of the outgoing high-speed highway 8, in a one-to-one relation, and the contents of each word of the speech holding memory 9 show the memory address of the memory 7 to be read out onto the corresponding time slot of the outgoing high-speed highway 8. Each address of the memory 7 holds the contents of the specific time slot of the incoming high-speed highway 6, and by reading out onto each time slot of the outgoing high-speed highway 8, the contents of the address of the memory 7 which is specified by the speech holding memory, the contents of time slot of the incoming high-speed highway 6 are switched and connected to the corresponding time slots of the outgoing high-speed highway 8. The time slots of the outgoing high-speed highway 8 are fixedly distributed onto the specific channels of the specific outgoing highway, by means of a demultiplexer 10, so as to carry out the switching of the connection between the incoming and outgoing highways.

Figure 5:
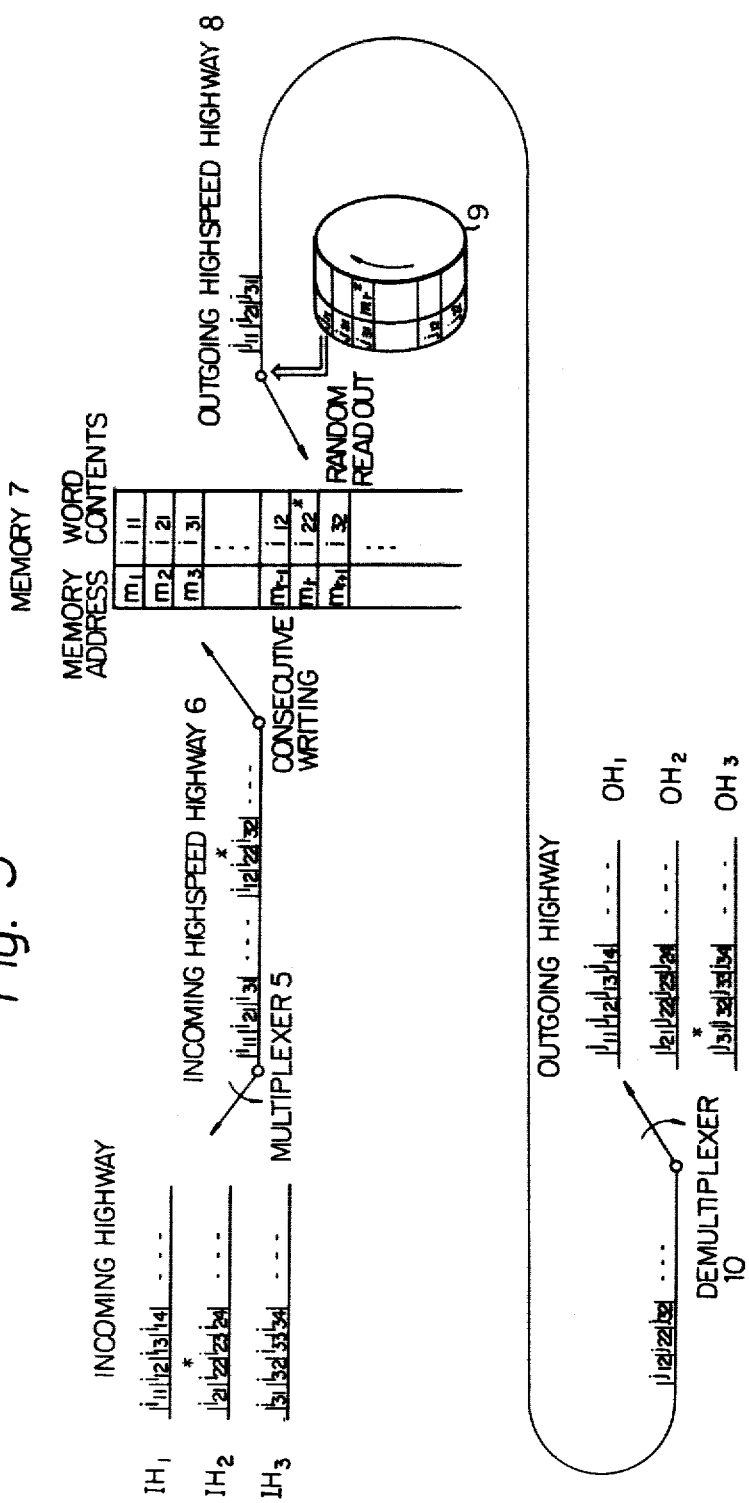
FIG. 5 is a diagram for explaining the operation of the telephone switching system of FIG. 4.

FIG. 5 schematically shows each step of the aforesaid process. In FIG. 5, if the channel $i_{22}$ of $IH_2$ is assumed to be connected to the channel $j_{31}$ of $OH_3$, the channel $i_{22}$ is at first multiplexed onto a specific time slot of the incoming high-speed highway 6, by means of the multiplexer 5, and then read into the memory 7 at a specific address $m_r$. If this address $m_r$ is written in the speech holding memory 9 at that address of the memory 9 which corresponds to the specific time slot $j_{31}$, the contents $m_r$ is read out from the memory 9 at the moment of the time slot $j_{31}$ of the outgoing high-speed highway 8, so that the contents of the memory 7 at the address $m_r$ are read out onto the outgoing high-speed highway 8. The time slot $j_{31}$ of the outgoing high-speed highway 8 is distributed to the channel $j_{31}$ of $OH_3$, by means of the demultiplexer 10, so that the channel $i_{22}$ of $IH_3$ and the channel $j_{31}$ of $OH_3$ are connected.

The state of connection of the speech-paths in the memory switch is controlled by the speech holding memory, so that double connection and re-establishment of speech-paths can be easily carried out simply by modifying the contents of the speech holding memory.

The operation for switching connections according to the present invention will now be described by referring to the flow of a call control.

In FIG. 4, if a call is generated at the channel i of the highway x (1IHx, 11OHx), the channel i of 1IHx is connected to the then idle channel k of 13OHz leading to the board trunk 14 through the main-speech-path switch 4. The channel k of 13OHz is connected to mth channel of 24IHp through a delay circuit 21 by closing the gate 18 of the board trunk 14 at the timing of the mth channel. The mth channel of 24IHp is switched to the then idle channel n of 27OHq leading to a telephone office 28, by means of the switchboard switch 25. FIG. 4 shows the case in which a plurality of the main-speech-path switches and a plurality of telephone offices are present and connected to each other by the switchboard switch 25. But if there is only one main-speech-path switch and only one telephone office, the switchboard switch 25 is not necessary and the telephone office is directly connected to the highway p (24IHp, 23OHp). The channel n of 27OHq is then connected to one of the switchboards 30 through a multiplexer 29, so that a speech-path is established from the calling subscriber to the switchboard. The PCM transmission path is of one-way type, so that another speech-path from the switchboard to the calling subscriber is established through a circuit tracing the channel n of 26IHq-the channel m of 23OHq - the delay circuit 15 - the gate 17 (timing k) - the channel k of 3IHz - the channel i of 11OHx.

As regards the connection between the switchboard and the called subscriber, the then idle channel 1 of IHZ3 and 13OHz are connected to the jth channels of 12OHy and 21Hy holding the called subscriber by means of the memory and the mth channels of 24IHp and 23OHp are reconnected to the channels 1 of 13OHz and 3IHz. The function of the switch 58 of FIG. 3 is carried out by selectively applying gate closing pulses to either of the suitable gates 16, 17, 18, 19 and 20. More particularly, the condition of the switch 58 set at the terminal position 60 corresponds to application of the closing pulses to the gates 17 and 18; the state set at the terminal 59 corresponds to the closing pulses to the gates 16 and 19; and the state set at the terminal 61 corresponds to the closing pulses to the gate 20. In short, the aforesaid reconnection is carried out by stopping the gate closing pulses of timings m and k being applied to the gates 18 and 17, while newly starting to apply the closing pulses of timings m and l to the gates 19 and 16.

The delay circuits 21 and 15 are to produce the time delays necessary for connection between channels k, l of 13OHZ and the channel m of 24IHp and between channels k, l of 3IHZ and the channel m of 23OHp. If certain relations are set up among the aforesaid k, l, and m, for instance as described below, the delay circuits 21 and 15 can be of fixed delays with intermediate taps; namely, $$m-k=c_1 \text{ if } m>k \quad (1)$$

$$m-k+N=c_1 \text{ if } m<k \quad (2)$$

$$m-l=c_2 \text{ if } m>l \quad (3)$$

$$m-l+N=c_2 \text{ if } m<l \quad (4)$$

here, $c_1$ and $c_2$ are integers satisfying the conditions of $$1 \leq c_1 < c_2 < N \quad (5)$$

and N is the number of channel on the highway.

Figures 6A, 6B:
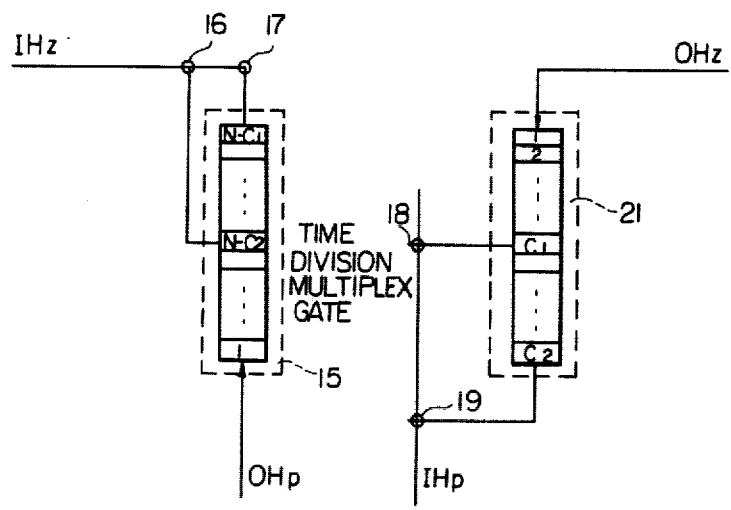
FIGS. 6(A) and 6(B) are diagrams illustrating practical examples of the delay circuits 15 and 21 of FIG. 4.

FIGS. 6(A) and 6(B) illustrate examples of the delay circuits 21 and 15 formed by using shift registers. The illustrated delay circuit 21 gives a delay for $c_2$ time slots in all, while giving a delay for $c_1$ time slots at the intermediate terminal. The other illustrated delay circuit 15 gives a delay for $(N-c_1)$ time slots in all, while giving a delay for $(N-c_2)$ time slots at the intermediate terminal.

When a series of operations for switching connections are over, the operator instructs both the calling subscriber and the called subscriber to start talking each other, and the connection of the speech-paths is switched to that of the monitor mode. In the monitor mode, the channel i of 1IHx is double connected to the channel j of 12OHy and the channel k of 13OHz, while the channel j of 20qu is double connected to the channel i of 11OHx and the channel l of 13OHz. The multiple connection of the speech-paths can be effected by writing the same address of the memory 7 at a plurality of addresses of the speech holding memory 9. For instance, if that address of the memory 7 which corresponds to the channel i of 1IHx is written in those addresses of the speech holding memory 9 which correspond to both the channel j of 12OHy and the channel k of 13OHz, then the channel i of 1IHx is double connected to the channel j of 12OHy and the channel k of 13OHz. The two-way speech between the calling subscriber and the called subscriber is directly carried through two speech-paths, i.e., one speech-path of the channel i of 1IHx - the channel j of 12OHy and another speech-path of the channel j of 2IHy - the channel i of 11OHx, without passing the board trunk 14. During the monitor mode, only the gate 20 is used in the board trunk 14, and the messages on the channels k and l of 13OHz are mixed by an adder 22 and connected to the channel m of 24IHp through the gate 20.

Figure 7:
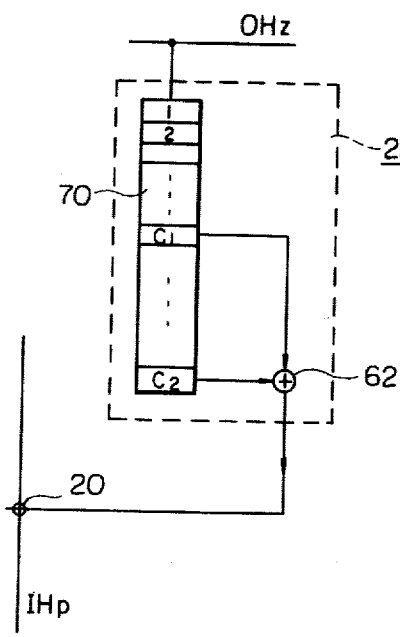
FIG. 7 is a diagram illustrating a practical example of the adder 22 of FIG. 4.
Figure 8:
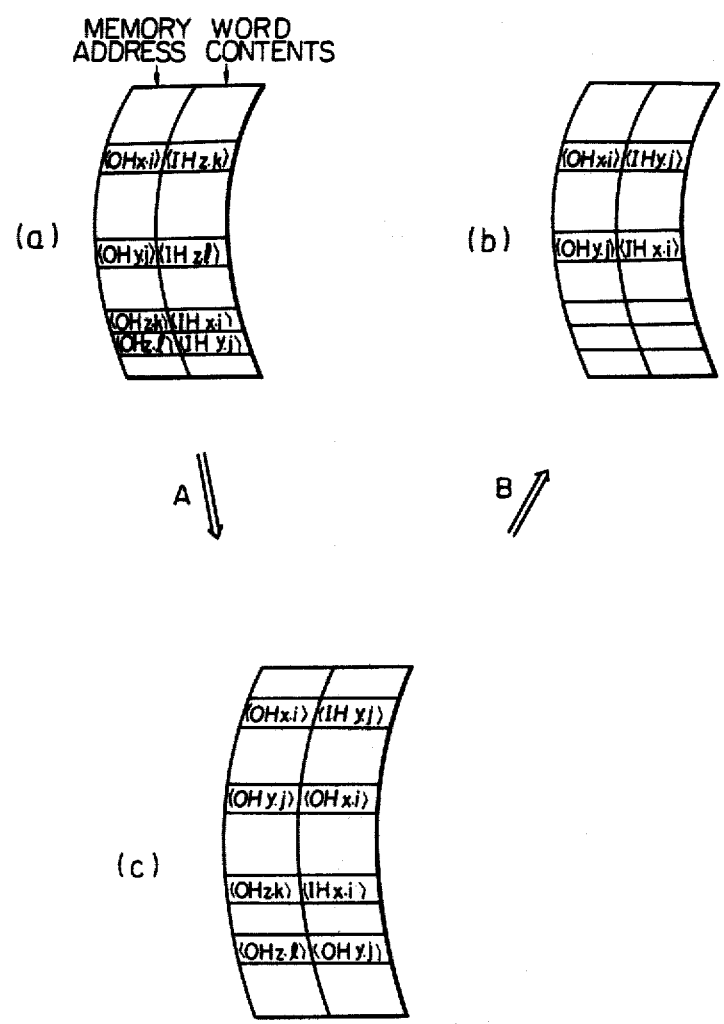
FIG. 8 is a diagram showing the variation of the contents of the speech holding memory 9 of FIG. 4.

FIG. 7 illustrates the formation of a practical example of the adder 22. At the moment of channel m, the contents of the channel k of 13OHz are present at the intermediate terminal at the step $c_1$ of a shift register 70, while the contents of the channel l are present at the terminal at the step $c_2$ of the shift register 70, so that after combining at the adder circuit 62, the mixed voice of the channels k and l is delivered to the channel m of 24IHp. When the start of regular speech between the calling subscriber and the called subscriber is confirmed in the monitor mode, all the speech-paths, the board trunk 14, and the switchboard 30, except the speech-paths directly connecting the calling subscriber to the called subscriber, are released and brought into conditions ready for processing other calls. The control of the speech-paths in the main-speech-path switch 4 can be carried out simply by rewriting the contents of the speech holding memory 9, and FIG. 8 shows the variation of the contents of the speech holding memory 9 in the aforesaid steps of call processing. In FIG. 8, for instance, $<OHx, i>$ represents the memory address of the speech holding memory 9 corresponding to the channel i of OHx, and $<IHz, k>$ represent the memory address of the memory 7 corresponding to the channel k of IHZ. The arrow A indicates the switching to the monitor mode, while the arrow B indicates the isolation of the switchboard. The rewriting of the speech holding memory 9 and the switching of the gates 16, 17, 18, 19 and 20 are all carried out by operating the switchboard 30 through a control device 31. The operator can establish the monitor mode whenever so required, for monitoring the speech.

Table 1 summarizes the set-up of the speech-paths at different steps of the aforesaid process of making the connection for speech.

TABLE 1

| State of connection | Direction of speech | | Speech paths | | Gate in board trunk |
|---|---|---|---|---|---|
| 1. Connection between calling subscriber and switchboard | Calling subscriber | → Switchboard | IHz OHz IHP OHq<br>i → k → m → n | | 18 |
| | Switchboard | → Calling subscriber | IHq OHP IHZ OHx<br>n → m → k → i | | 17 |
| 2. Connection between switchboard and called subscriber | Switchboard | → subscriber Called | IHq OHP IHZ OHy<br>n → m → l → j | | 16 |
| | Called subscriber | → Switchboard | IHy OHZ IHP OHq<br>j → l → m → n | | 19 |
| 3. Connection between calling and called subscribers | Calling subscriber | → Called subscriber | IHx<br>i → j | OHy | — |
| | Called subscriber | → Calling subscriber | IHy | OHx | — |
| 4. Monitor of speech | Calling subscriber | → Called subscriber | IHx<br>j → i | OHy | — |
| | Called subscriber | → Calling subscriber | IHy | OHx | — |
| | subscriber Calling and called subscribers | → subscriber<br>→ Switchboard | IHx OHZ<br>i → k<br>IHy OHZ<br>j → l | } → | IHP OHq<br>m → n | 20 |

With the present invention, the speech-paths are reconnected in the main-speech-path switch depending on different conditions, i.e., the connection-making for the call generated, the speech monitoring, the conversation between the calling subscriber and the called subscriber. Accordingly, except the time periods when operator acts, the exclusive use of two speech-paths in the main-speech-path switch by a call and the inefficient use of the board trunk are eliminated, so that the efficiency in utilizing the switchboard system including the main-speech-path switch and the board trunk can be improved. Furthermore, the monitoring of the speech is conducted under the conditions that the calling subscriber and the called subscriber are directly connected to each other through the main-speech-path switch by using the double connections in the main-speech-path switch, so that the speech between the two subscribers is not affected at all by the monitoring.

According to the present invention, it is not necessary to connect the calling subscriber to the called subscriber in the board trunk, so that the function of 3-party speech becomes unnecessary in the board trunk and the construction of the trunk can be simplified. For the board trunk, it is sufficient to provide the function of switching between the speech from the switchboard to the calling subscriber, and the speech from the switchboard to the called subscriber during the call connecting stage and to provide one adder for mixing the speech from the calling subscriber and the speech from the called subscriber into one speech during the monitoring of the speech. Due to the speech switching function and the speech mixing function of the board trunk, as far as the speech-path between the board trunk and the switchboard is concerned, one speech-path is always sufficient for one call, so that when a telephone office is built separately at a remote location from a switching station, the transmission line between the telephone office and the switching station can be efficiently used. In general, the construction of a board trunk tends to be complicated, because a time switch is necessary therein for switching time slots in order to establish mutual connection among three channels having different time slots for the calling subscriber side, the called subscriber side, and the switchboard. The present invention is characterized in that there is provided a certain relation among the aforesaid time slots for the three channels, and the aforesaid time switch is replaced by a simple fixed delay means such as shift registers.

The system according to the present invention can be theoretically applied to telephone switch devices other than the PCM switching device using a single stage memory switch. However, the single-stage memory switch has the most suitable switch construction for the system of the present invention, because of the easiness in setting up the speech-paths and the absence of the need for matching of idle speech-paths in establishing speech-paths.

Although the present invention has been described with a certain degree of particularity, it is understood that the present disclosure has been made only by way of example and that numerous changes in the details of construction and combination and arrangement of parts may be resorted to without departing from the spirit and the scope of the present invention as hereafter claimed.

What is claimed is:

1. A call processing apparatus in a telephone switching system having operator assistance, said apparatus comprising a main speech-path switch means connected to a plurality of incoming channels and a plurality of outgoing channels; a plurality of board trunk means, each of said board trunk means being coupled to said main speech-path switch means; at least one switchboard means; switchboard switch means for coupling said at least one switchboard means to one of said board trunk means; and control means coupled to said main speech-path switch means, said board trunk means and said switchboard means, for controlling the operation of said main speech-path switch means and said board trunk means in response to the operation of said switchboard means; wherein each of said board trunk means includes a switching means having a first state for coupling said switchboard switch means to one of said plurality of incoming channels through said main speech-path switch means, a second state for coupling said switch-board switch means to one of said plurality of outgoing channels through said main speech-path switch means, and a third state for coupling said switchboard switch means to only an incoming portion of said incoming and outgoing channels through said main speech-path switch means; said apparatus having a first mode of operation wherein said switchboard means is connected to one of said plurality of incoming channels and to one of said plurality of outgoing channels through said main speech-path switch means, one of said board trunk means, and said switchboard switch means, said switching means in said board trunk means being switched between its first and second states for connecting said switchboard means to either said incoming channel or said outgoing channel, thereby enabling an operator to assist in communication between said incoming and outgoing channels; said apparatus having a second mode of operation wherein said incoming channel is directly connected to said outgoing channel through said main speech-path switch means and said switchboard means is connected to the incoming portions of both said incoming and outgoing channels through said main speech-path switch means, said board trunk means and said switchboard switch means, said switching means in said board trunk means being in its third state, thereby enabling the operator to monitor said incoming and outgoing channel; said apparatus having a third mode of operation wherein said incoming channel is connected directly to said outgoing channel through said main speech-path switch means and said board trunk means is disconnected from the main speech-path switch means.

2. A call processing system with an operator assistance in a telephone switching system comprising a time-divisional main speech-path switch having a plurality of incoming highways and a plurality of outgoing highways; a plurality of time divisional operating board trunks, each board trunk having at least two fixed delay circuits for providing a fixed delay time to the signals to/from said main speech-path switch, said board trunks being adapted to be connected to both incoming and outgoing highways of said main speech-path switch; a board switch inserted between said board trunks and a plurality of switchboards for an operator assistance; and a control device for controlling said main speech-path switch, said board trunks, and said switchboard, wherein time slots k connecting the calling channel to the board trunks, time slot l connecting the called channel to the board trunks, and time slot m connecting the switchboard to the board trunks have the following relationships:

$$m - k = c_1 \text{ if } m > k$$

$$m - K + N = c_1 \text{ if } m < k$$

$$m - l = c_2 \text{ if } m > l$$

$$m - l + N = c_2 \text{ if } m < l$$

where $c_1$ and $c_2$ are integers satisfying $1 = c_1 < c_2 < N$ and N is the number of channels of each highway; and the connections among said time slots and time matching for signal processing is carried out by said delay circuit with fixed delay time set in said board trunks; and wherein in a first mode of operation, connections between a calling channel and one of said board trunks and between a called channel and said one of said board trunks are formed through said main speech-path switch so as to enable conversation between an operator on a switchboard connected to said one of said board trunks and either a calling subscriber or a called subscriber, in a second mode of operation, the calling channel is directly connected to the called channel through the main speech-path switch while simultaneously connecting said two channels to said one of said board trunks through the main speech-path switch so as to enable an operator to monitor the speech at said switchboard between the calling subscriber and the called subscriber, and in a third mode of operation, the calling channel is directly connected to the called channel through the main speech-path switch and said two channels are disconnected from said one of said board trunks.

* * * * *